United States Patent Office 3,366,697
Patented Jan. 30, 1968

3,366,697
1-FLUORO-1,1-DINITROALKANES
Mortimer J. Kamlet, London, England, assignor to the United States of America as represented by the Secretary of the Navy
No Drawing. Filed July 31, 1963, Ser. No. 300,408
9 Claims. (Cl. 260—644)

The invention described herein may be manufactured and used by or for the Government of the United States of America for governmental purposes without the payment of any royalties thereon or therefor.

This invention relates to new, thermally stable monopropellants. In particular, the invention relates to 1-fluoro-1,1-dinitroalkanes and a new method of preparation thereof.

Fluorination procedures are generally difficult and troublesome because of tedious procedures which are necessarily instituted due to the extremely high reactivity of most fluorinating agents and the resultant damage to laboratory equipment, because of the expense of constructing special systems to provide for venting and destroying the fluorinating agents and because of the extremely high toxicity of such reagents when inhaled or absorbed by the human organism.

It is therefore of importance to those interested in arts which require fluorination procedures that a method be developed which effectively alleviates the usual difficulties encountered when working with highly corrosive and toxic reagents.

In the preparation of the novel monopropellants of this invention, it has been found that the use of perchloryl fluoride, because of its relative ease of handling and relatively innocuous toxicological properties, effectively circumvents the aforementioned problems. Further, the usual carbon-carbon and carbon-hydrogen cleavage incidental to the use of many fluorinating agents is eliminated via the perchloryl fluoride route.

It is an object of this invention to provide novel monopropellants having improved thermal stability.

Another object of this invention is to provide a novel method for the preparation of 1-fluoro-1,1-dinitroalkanes.

GENERAL PROCEDURE

The preparation of the 1-fluoro-1,1-dinitroalkanes is accomplished by the reaction of the alkali metal salts of 1,1-dinitroalkanes with perchloryl fluoride. The reaction of potassium dinitroalkanes or sodium dinitroalkanes with perchloryl fluoride may be carried out by bubbling the gas into a well-stirred suspension of the dinitroalkane salt in a solvent in which the salt is at least partially soluble. The reaction is evidenced by the gradual solution of the yellow dinitroalkane salt and the precipitation of white potassium chlorate. The reaction rate is primarily determined by the speed of solution of the gas, thus by increasing the stirring rate, the reaction rate will be accelerated. Conversely, decreasing the stirring rate will have the opposite effect.

Any solvent in which both the perchloryl fluoride and the dinitroalkane salts have at least partial solubility may be used. Preferred solvents are those in which the perchloryl fluoride and the dinitroalkane salts have mutually maximal solubilities. Thus, ether may be used although the reaction in such solvent is slow because of the relative insolubility of the dinitroalkane salt therein. Correspondingly, water may be used although the reaction in that medium is slow, also because of the relative insolubility of perchloryl fluoride therein. Preferred solvents are methanol, aqueous methanol and dimethylformamide.

The temperature are preferably within the range of about 0° C. to about 50° C. but this range is merely illustrated to give the most convenient rates and, since temperature control is quite easy, temperatures above and below the maximum and minimum values of the range may be used.

In all operations which involve the filtration of potassium chlorate, the filtration operation should be well shielded and the filter cakes should be exhaustively washed with additional solvent before being allowed to air dry. This precaution is necessary since, during the course of the filtrations, a stage is passed wherein the perchlorate-fuel-explosive ratio represents a potentially dangerous situation.

MONOPROPELLANTS

The novel monopropellants provided by this invention correspond to the formula

where R is ethyl or propyl. The starting materials from which these compounds are derived are the alkali metal salts of 1,1-dinitroalkanes such as, for example, the sodium or potassium salts of 1,1-dinitroethane and 1,1-dinitropropane. The preparation of these starting materials is set forth in copending application Ser. No. 236,169, filed Nov. 7, 1962, now abandoned.

Example I

PREPARATION OF FLUORODINITROETHANE

A suspension of 90 grams potassium dinitroethane (0.57 mole) in 750 milliliters methanol and 200 milliliters water was prepared. Perchloryl fluoride was then bubbled into this suspension for about seven hours at a temperature of 40° C. At the end of seven hours, the insoluble yellow crystals of the dinitroalkane salt were replaced by white potassium chlorate, the solution being of a chartreuse color. After filtration, to separate the potassium chlorate, the solution was diluted with 500 milliliters water and extracted with 500 milliliters ether. The ether phase was then washed several times with water to remove most of the methanol, dried over calcium chloride and the ether was evaporated in vacuo. After fractionation, the colorless fluorodinitroethane (yield=54% of theoretical based on the potassium salt) had the following properties:

Thermal stability [1] ---- 3% wt. loss in 8 hrs. at 450° F.
Specific impulse
  (calc'd) ---------- 260–262 sec. (1000 p.s.i./14.7 p.s.i. exit).
Heat of formation ---- −67.34 ± 1.03 cal./g.
Density -------------- 1.425 g./cc.
(Density) (Impulse)[2] -- (1.425) (261).
Freezing point -------- −35° C.
Boiling point --------- 40.5° C. (20 mm. Hg).

[1] This is approximately 100° F. better than conventional liquid monopropellants.
[2] Better than hydrazine.

Analysis of the final product showed the following: calculated for $C_2H_3N_2O_4F$: C, 17.38; H, 2.17; N, 20.25. Found: C, 17.58; H, 2.18; N, 19.74.

Example II

PREPARATION OF FLUORODINITROPROPANE

A suspension of 100 grams potassium dinitropropane (0.58 mole) and 750 milliliters methanol was prepared. Perchloryl fluoride was bubbled into the suspension at an initial temperature of 28° C. which was slowly increased to 38° C. and held at that temperature for approximately two and one-half hours. The solution was of a chartreuse color with white crystals of potassium chlorate. To the solution was added 300 milliliters chloroform in 500 milliliters water and the total mixture was stirred. Most of the aqueous phase was decanted and an additional 500 milliliters water added. Upon separation and subsequent combination of the aqueous phases, they were extracted twice with 250 milliliter portions of chloroform and the combined chloroform phases were then washed sequentially with 250 milliliters water, 250 milliliters of 2% potassium chloride and 250 milliliters water. The remaining colorless organic phase was dried over calcium chloride and fractionated to give a resultant yield (59% of theoretical based on the potassium salt) of fluorodinitropropane having the following properties:

Thermal stability _____ 27% wt. loss in 8 hrs. at 450° C.
Specific impulse
   (calc'd) _____ 220 sec. (1000 p.s.i./14.7 p.s.i.).
Heat of formation ____ −80.5 ± 3.5 K. cal./mole.
Density _____ 1.34 g./cc.
(Density) (Impulse) __ (1.34) (220).
Freezing point _____ −60° C.
Boiling point _____ 145° C.

Analysis of the final product was as follows: calculated for $C_3H_5N_2O_4F$: C, 23.68; H, 3.29; N, 18.41. Found: C, 23.90; H, 3.21; N, 18.30.

The novel compounds provided by this invention find utility as monopropellants of improved thermal stability and may be used in lieu of conventional monopropellants.

Obviously many modifications and variations of the present invention are possible in the light of the above teachings. It is therefore to be understood, that within the scope of the appended claims, the invention may be practiced otherwise than as specifically described.

Having thus described the invention, what is claimed and desired to be secured by Letters Patent of the United States is:

1. A compound having the formula

where R is selected from the group consisting of ethyl and propyl.

2. 1-fluoro-1,1-dinitroethane.
3. 1-fluoro-1,1-dinitropropane.
4. The process for preparing fluorodinitroalkanes which comprises contacting a solution of an alkali metal salt of a dinitroalkane with perchloryl fluoride.
5. The process of claim 4 wherein the alkali metal is sodium.
6. The process of claim 4 wherein the alkali metal is potassium.
7. The process for preparing fluorodinitroalkanes which comprises contacting an alkali metal salt of a dinitroalkane with perchloryl fluoride in the presence of a solvent at a temperature of from about 0° C. to about 50° C.
8. The process of claim 7 wherein the solvent is an alcohol.
9. The process of claim 7 wherein the solvent is dimethylformamide.

References Cited

UNITED STATES PATENTS 3,127,736    4/1964    Bost et al.

OTHER REFERENCES

Noble, Jr. et al., Chem. Review, vol. 64, pp. 42, 56 and 57 (1964).

CARL D. QUARFORTH, *Primary Examiner.*
L. A. SEBASTIAN, *Assistant Examiner.*